UNITED STATES PATENT OFFICE.

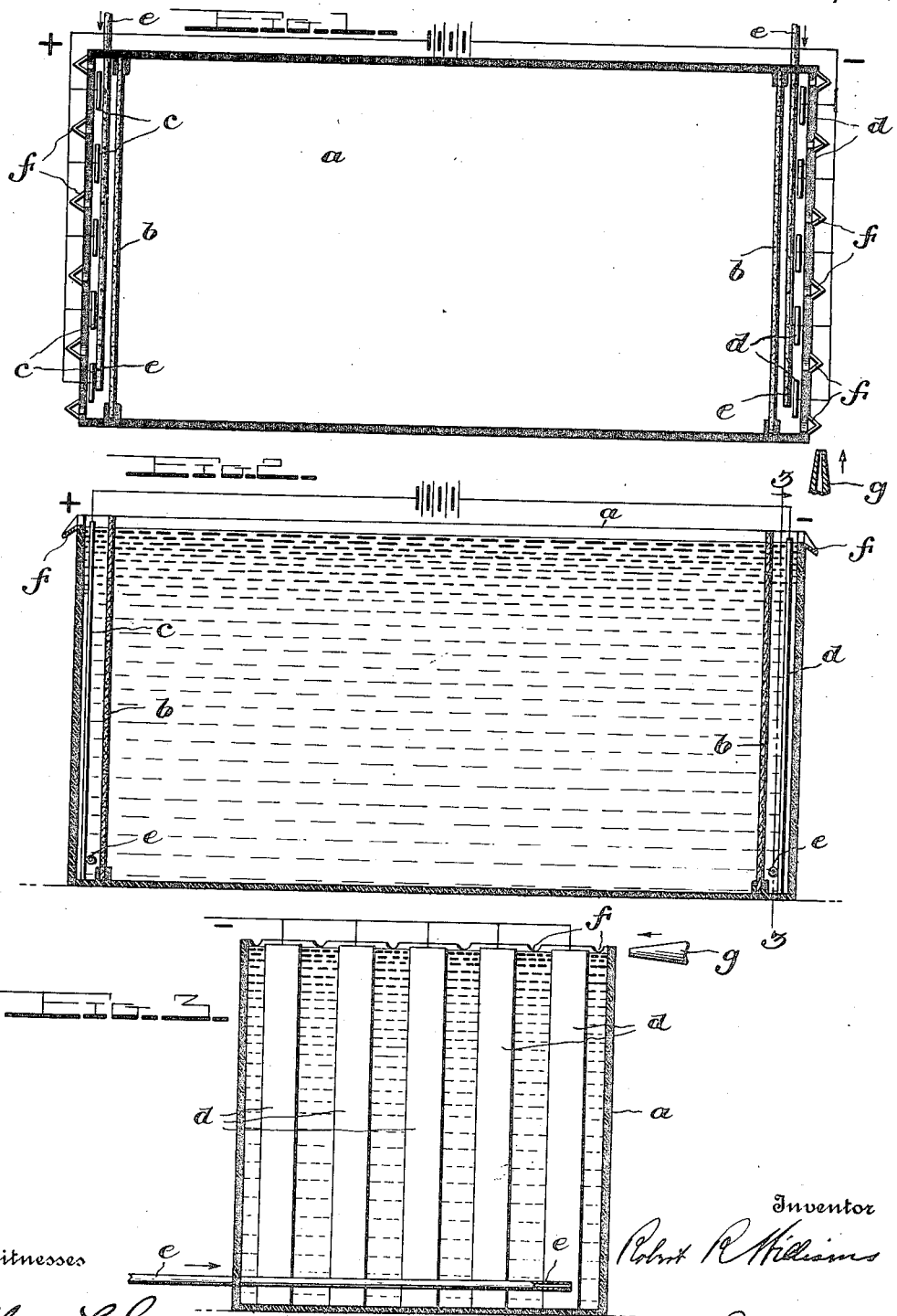

ROBERT R. WILLIAMS, OF MANILA, PHILIPPINE ISLANDS.

PROCESS OF REFINING SUGAR.

1,256,758.   Specification of Letters Patent.   Patented Feb. 19, 1918.

Application filed January 26, 1914, Serial No. 814,401. Renewed August 29, 1917. Serial No. 188,870.

*To all whom it may concern:*

Be it known that I, ROBERT R. WILLIAMS, a citizen of the United States, and a resident of the city of Manila, Philippine Islands, have invented certain new and useful Improvements in the Process of Refining Sugar, of which the following is a full and clear specification, reference being had to the accompanying drawings, in which—

Figure 1 is a plan view;

Fig. 2 a vertical longitudinal section; and

Fig. 3 a transverse section on the line 3—3 of Fig. 2.

My invention pertains to an electrolytic process for the removal of any acids, bases, or salts (electrolytes) from solutions of sugar for the purpose of increasing the purity of the sugar solution and facilitating further utilization.

The process is particularly designed for use upon the sap of the nipa palm. In the Philippine Islands and elsewhere there are large areas of nipa palm swamp. These palms, when in flower, are tapped and the exuding juice collected. The juice contains sucrose to the amount of 14 to 15 per cent. by weight, with a purity of 80 to 90 per cent. Most of the solid material other than sucrose in the juice consists of sodium chlorid and other sea water salts, as the plants grow in tidal swamps and are usually covered by salt water at high tide.

The juice of the nipa palm has been used for generations for the manufacture of alcoholic beverages and in recent years for the production of alcohol for industrial and medicinal use. The process is of course simply one of fermentation of the juice with or without subsequent distillation. Within the past years it has been suggested that the nipa palm sap be used for making sugar. Means have been found for collecting and preserving the sap so that it can be transported to a sugar-mill without serious deterioration and at a moderate cost. The sap can be and has been treated experimentally by practically the same method as is commonly used for sugar cane juice and good results obtained. The process is in brief as follows: The juice is lightly limed and treated with carbon dioxid, settled and the clear juice warmed and sulfured in the usual way. It is then evaporated *in vacuo*, grained in the pan and centrifuged just as cane sugar is. The resulting "first molasses" from the nipa sap differs from that of cane molasses in that the impurities, instead of being largely glucose, invert sugar, gums and the like, consist in large part of inorganic salts (sodium chlorid chiefly). It is at this point that it would probably be most advantageous to apply my process. The process might, of course, be applied to the original palm sap or the liquors at any stage of the subsequent evaporation, but it will probably be most useful as a substitute for the Steffens process for treating molasses. Obviously, the process might have application elsewhere than in the treatment of nipa palm sap. For example, it might be of use in the treatment of cane or beet juice containing large amounts of neutral lime salts and perhaps in other industries, and I therefore avoid restricting the scope of my patent in this respect.

One way of carrying out my process is briefly as follows: The liquor to be treated is run into a tank $a$ of concrete or other non-conducting material. The tank is divided into three compartments, the partitions $b$ being of porous clay such as is used for filters. The central compartment into which the sugar solution is run is large, the end ones being comparatively small and preferably narrow. Anodes $c$ of Acheson graphite and cathodes $d$ of iron are immersed in a weak salt solution with which the small end compartments are filled. A direct current of suitable voltage and amperage is then passed through the liquor continuously. The porous clay partitions prevent the diffusion of the non-electrolyte from the large into the small compartments, but permit the transit of ions through it. The result, of course, will be an accumulation of basic hydroxids around the cathodes with the evolution of hydrogen in the case of alkalis or alkali earth metals. At the same time, there is similar accumulation of acidic substances around the anodes. In order to prevent too great accumulation at the electrodes, the liquids in the electrode compartments are constantly being replaced by water supplied through pipes $e$, the more concentrated liquids being continuously discharged from the compartments by an overflow. The overflow discharges are made in small streams by means of spouts $f$ or otherwise, in order to avoid considerable loss of current from this source. The conductivity of the discharge streams may be still further diminished when necessary by the use of an air blast *g*, which breaks up these streams into a spray. The size of the tank and the electrodes would of course determine the current. I have found the current density of 2 to 4 amperes per sq. dm. satisfactory. The voltage should run from 5 to 25 according to the size of the tanks. The current must be direct and may be produced by an ordinary or a varying voltage dynamo or storage batteries can be used.

It will, of course, be understood that many other forms of apparatus may be employed for carrying out my process.

Having thus described my invention, what I claim is:

1. The process herein described of purifying a solution of sugars consisting in subjecting the solution to the electrolytic action of a direct current of electricity to thereby cause the impurities susceptible to the electrolytic action to pass through porous partitions to adjacent compartments in which the anode and cathode are located, both electrodes being immersed in a stream of fresh water, causing the impurities to be carried away from the vicinity of the anode and cathode and be discharged.

2. The process herein described of purifying a solution of sugar, consisting in subjecting the solution to the electrolytic action of a direct current of electricity to thereby cause the impurities susceptible to the electrolytic action to pass through a porous partition to an adjacent compartment containing an electrode and water and continuously supplying fresh water to said electrode compartment and exhausting water therefrom to cause a stream of water to flow about said electrode and carry away the impurities therefrom.

In testimony whereof I hereunto affix my signature in the presence of two witnesses.

ROBERT R. WILLIAMS.

Witnesses:
J. N. NOON,
RAY CULVIG.